United States Patent
Moon et al.

(10) Patent No.: US 7,409,216 B2
(45) Date of Patent: Aug. 5, 2008

(54) MOBILE COMMUNICATION CONTROLLING APPARATUS AND INTER-FREQUENCY HANDOVER CONTROL METHOD

(75) Inventors: Sung Uk Moon, Yokosuka (JP);
Takehiro Nakamura, Yokosuka (JP);
Minami Ishii, Yokohama (JP);
Masafumi Usuda, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 592 days.

(21) Appl. No.: 10/820,859

(22) Filed: Apr. 9, 2004

(65) Prior Publication Data
US 2004/0259548 A1    Dec. 23, 2004

(30) Foreign Application Priority Data
Apr. 10, 2003    (JP) .............................. 2003-106817

(51) Int. Cl.
*H04Q 7/20* (2006.01)
(52) U.S. Cl. .................. 455/437; 455/442; 370/332
(58) Field of Classification Search ................ 455/436, 455/437, 438, 440–445, 450–453; 370/331–333, 370/325, 330
See application file for complete search history.

(56) References Cited

U.S. PATENT DOCUMENTS

| | | | | |
|---|---|---|---|---|
| 5,896,368 A * | 4/1999 | Dahlman et al. | ............. | 370/335 |
| 6,597,679 B1 * | 7/2003 | Willars | ............. | 370/342 |
| 6,810,019 B2 * | 10/2004 | Steudle | ............. | 370/252 |
| 6,822,948 B2 * | 11/2004 | Bergstrom et al. | ............. | 370/332 |
| 6,845,238 B1 * | 1/2005 | Muller | ............. | 455/436 |
| 6,868,075 B1 * | 3/2005 | Narvinger et al. | ............. | 370/335 |
| 7,016,320 B1 * | 3/2006 | Petersson et al. | ............. | 370/331 |
| 7,020,108 B2 * | 3/2006 | Virtanen | ............. | 370/331 |
| 7,218,646 B2 * | 5/2007 | Voyer et al. | ............. | 370/470 |
| 2002/0019231 A1 * | 2/2002 | Palenius et al. | ............. | 455/437 |

FOREIGN PATENT DOCUMENTS

JP    2003-78936    3/2003

OTHER PUBLICATIONS

3rd Generation Partnership Project; Technical Specification Group Radio Access Network; 25.211 Physical Channels and Mapping of Transport Channels Onto Physical Channels, vol. 3.12.0, pp. 1-46, Sep. 2002.

* cited by examiner

*Primary Examiner*—Blane J. Jackson
(74) *Attorney, Agent, or Firm*—Oblon, Spivak, McClelland, Maier & Neustadt, P.C.

(57) ABSTRACT

A mobile communication controlling apparatus for controlling inter-frequency handover includes a required quality identifying unit configured to identify a quality required for data addressed to a mobile station, a transmission rate control unit configured to control a data transmission rate of a higher layer based on the identification result supplied from the required quality identifying unit, and an inter-frequency handover instruction unit configured to temporarily suspend signal transmission from a radio base station connected to the mobile communication controlling apparatus and allow the mobile station to perform inter-frequency measurement.

6 Claims, 10 Drawing Sheets

FIG.7

| TYPE OF SERVICE | DELAY PRIORITY | QoS (QUALITY OF SERVICE) |
|---|---|---|
| 000 | 00 | 0 |
| 001 | 00 | 0 |
| — | — | — |
| 110 | 11 | 3 |
| 111 | 11 | 3 |

MOBILE COMMUNICATION CONTROLLING APPARATUS AND INTER-FREQUENCY HANDOVER CONTROL METHOD

BACKGROUND OF THE INVENTION

The present invention relates to a mobile communication controlling apparatus and an inter-frequency handover control method that allow a mobile station to correctly perform inter-frequency handover even in the real-time media servicing environment.

Third generation mobile systems, which conform to the proposed IMT-2000 standards, are discussed in the 3GPP (the Third Generation Partnership Project) Technical Specifications and Technical Reports.

One of the proposed IMT-2000 standards for third generation mobile networks is a WCDMA based standard. In WCDMA, the same frequencies are reused repeatedly in the cells of a cellular system, and accordingly, inter-frequency handover is unnecessary in the same cellular system. However, in considering concomitance with existing systems, handover between different carrier frequencies (including handover to another cell using a different frequency in the same system and handover to a cell of another system) is required. In view of such circumstances, the 3GPP proposes compressed mode transmission, which is a technique for realizing inter-frequency handover. See 3rd Generation Partnership Project Technical Specification Group Radio Access Network, 25.211 Physical channel and mapping of transport channels onto physical channels, September, 2002.

Explanation is made of the compressed mode. When a mobile station performs inter-frequency handover, a certain time period for switching frequencies and establishing synchronization is required. For this reason, in a portion of the time frame of the active radio link, transmission is suspended (i.e., signal transmission from a base station is temporarily off), and during which period, a different carrier frequency transmitted from a candidate radio base station is monitored. The data of the suspended time period are transmitted at a high rate as compressed frames during the next active period of time. The transmission rate and the link quality are maintained by increasing power. The compressed mode is a function of inter-frequency measurement on frequency bands of other cells for carrying out inter-frequency handover.

FIG. 1 illustrates an example of compressed mode transmission. The timing of shifting to the compressed mode is determined by the network. The network transmits a parameter set required in the compressed mode to the mobile station. In the compressed mode, no data transmission to the mobile station is carried out during the transmission gap. In the compressed mode frame, transmission power is temporarily increased in order to prevent degradation of communication quality (such as the bit error rate (BET) or the block error rate (BLER)) due to fall of the gain during the suspended time period. The transmission gap can be repeated in the compressed mode. In addition, the type of the compression mode (defined by the number of time slots in a transmission gap, the time interval between transmission gaps, the number of repetitions of transmission gap, and other factors, all of which are given as variables) can be changed in response to a measuring request.

FIG. 2 shows an example of the uplink compressed mode frame format. In the uplink frame, the data channel (illustrated in the upper line) and the control channel (illustrated in the lower line) containing the pilot bits are I/Q multiplexed for each radio frame, and a transmission gap is inserted between the transmission frames.

FIG. 3 shows an example of the downlink compressed mode frame format. In the downlink frame, the data channel and the control channel are time-multiplexed. There are two types of downlink frame formats in the compressed mode. In type A compressed mode frame format, priority is given to maximizing the length of the transmission gap. In type B compressed mode frame format, priority is given to power control, and a transmission power control (TPC) slot is inserted in the transmission gap.

In the compressed mode, compressed frames are set to occur periodically because the data to be transmitted in a 10-milisecond radio frame have to be packed in a radio frame including the transmission gap. There are three schemes applicable to the compressed mode, as shown in Table 1.

TABLE 1

| SCHEME | OUTLINE |
| --- | --- |
| COMPRESSED MODE BY PUNCTURING | The number of transmission bits is reduced by a function of rate matching (puncturing). The spreading factor in the ordinary mode is used in the compressed mode. |
| COMPRESSED MODE BY REDUCING SPREADING BY 2 (SF/2) | The spreading factor (SF) is changed such that the same number of bits as in the ordinary mode can be transmitted in the time slot other than the transmission gap. |
| COMPRESSED MODE BY HIGHER LAYER SCHEDULING | The transport format combinations (TFCs) are limited by higher layers in accordance with the number of bits transmittable in the time slot other than the transmission gap. The SF in the ordinary mode is used in the compressed mode. |

Meanwhile, JP 2003-78936A discloses a technique for reducing degradation of communications quality by reducing the compressed mode transmission as much as possible. In this publication, the radio network controller (RNC) instructs the mobile station to carry out the compressed mode only when a predetermined condition is satisfied. Thus, the compressed mode is implemented intermittently, unlike the continuing or periodic execution of the compressed mode.

With the above-described conventional techniques of CDMA mobile communications systems using multiple carrier frequencies, when a mobile station is going to carry out handover, the transmission mode is shifted to the compressed mode for allowing the inter-frequency measurement at the mobile station, while signal transmission from a base station is temporarily suspended. Accordingly, the amount of transmittable data is reduced in the meanwhile, and data transmission delays occur. For this reason, the compressed mode is unsuitable for streaming services (for downloading data and immediately reproducing the arriving data), such as Internet broadcasts, that do not accept variation or fluctuation in delay.

SUMMARY OF THE INVENTION

The present invention is conceived to overcome the above-described problems, and it is an object of the present invention to provide a mobile communication controlling apparatus and a handover control method that allow a mobile station to carry out inter-frequency handover even in a communication environment in which real-time media services that do not accept delay variation (or delay spread) are provided over the network.

To achieve the object, in one aspect of the invention, a mobile communication controlling apparatus includes a required quality identifying unit configured to identify a quality required for data addressed to a mobile station, a transmission rate control unit configured to control a data transmission rate of a higher layer based on the identification result supplied from the required quality identifying unit, and an inter-frequency handover instruction unit configured to temporarily suspend signal transmission from a radio base station connected to the mobile communication controlling apparatus and allow the mobile station to perform inter-frequency measurement.

As an example of the transmission rate control, the required quality identifying unit determines whether the identified quality accepts delay variation. If the identified quality does not accept delay variation, then the transmission rate control unit reduces the transmission rate of the higher layer.

Preferably, the transmission rate control unit reduces the transmission rate of the higher layer below the transmission rate of the physical layer when the identified quality does not accept delay variation.

By controlling the transmission rate of a higher layer based on the quality required for the traffic, prior to the instruction of inter-frequency measurement to the mobile station, data delay due to transmission gap for inter-frequency measurement can be reduced as much as possible. Accordingly, inter-frequency handover is performed correctly even in an environment in which real-time video or audio data that do not accept delay fluctuation are streamed.

In another aspect of the invention, an inter-frequency handover control method is provided. In this method, a wireless link is established between a mobile station and a radio base station, and a trigger for inter-frequency handover for the mobile station communicating with the radio base station is detected. Then, it is determined whether a quality required for data transmitted to the mobile station accepts delay variation. If the required quality does not accept delay variation, a data transmission rate of a higher layer is reduced. Then, signal transmission from the radio base station is temporarily suspended to allow the mobile station to perform inter-frequency measurement.

BRIEF DESCRIPTION OF THE DRAWINGS

Other objects, features, and advantages of the invention will become more apparent from the following detailed description when read in conjunction with the accompanying drawings, in which

FIG. 7 shows an example of the required quality identification table used in the radio network control apparatus shown in FIG. 5;

DETAILED DESCRIPTION OF THE PREFERRED EMBODIMENT

The present invention is described in detail below in conjunction with the attached drawings.

Figure 1:
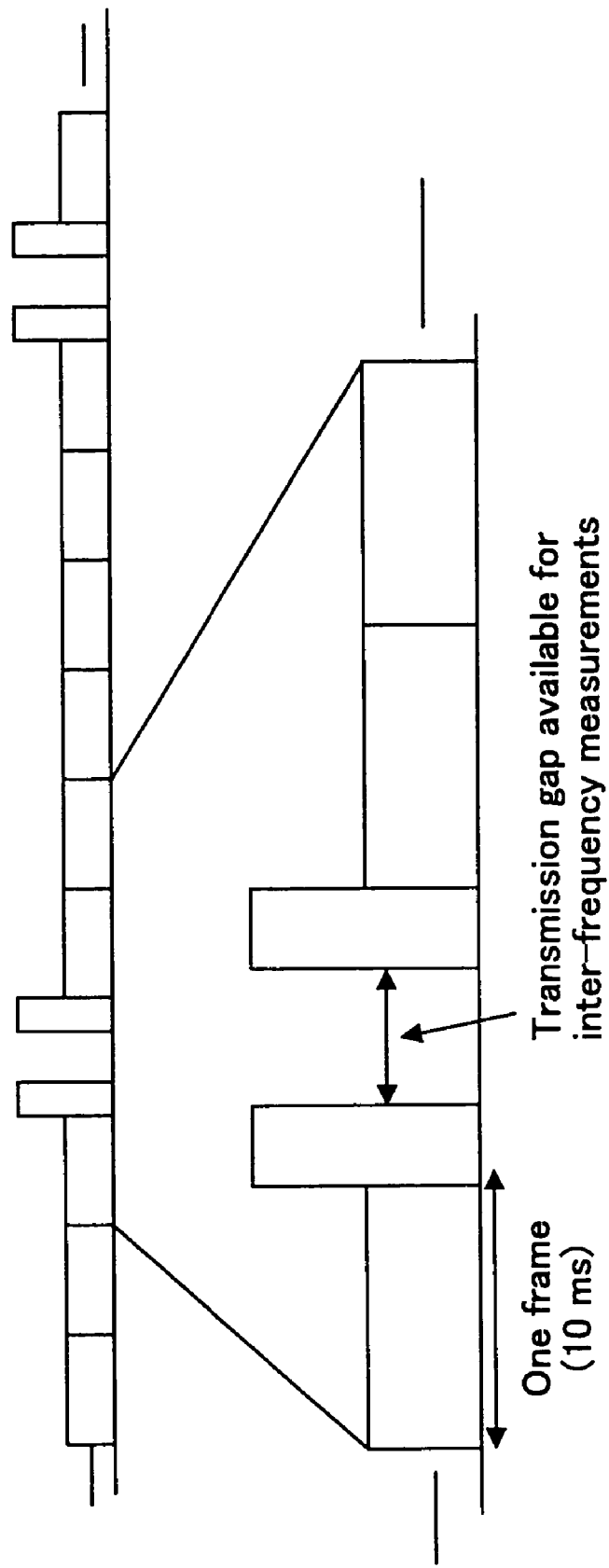
FIG. 1 illustrates a general idea of compressed mode transmission for inter-frequency handover.
Figure 2:
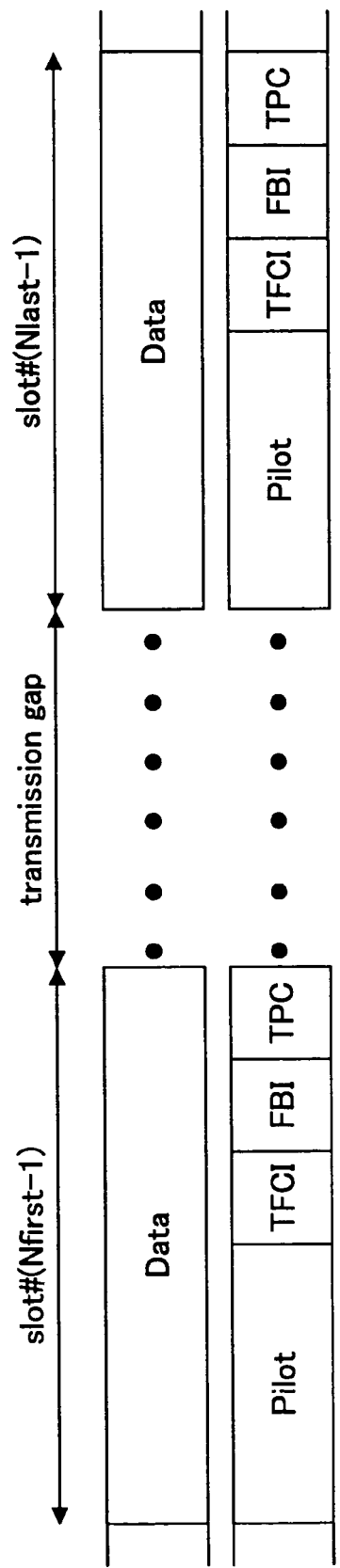
FIG. 2 shows an example of uplink compressed mode frame format.
Figure 3:
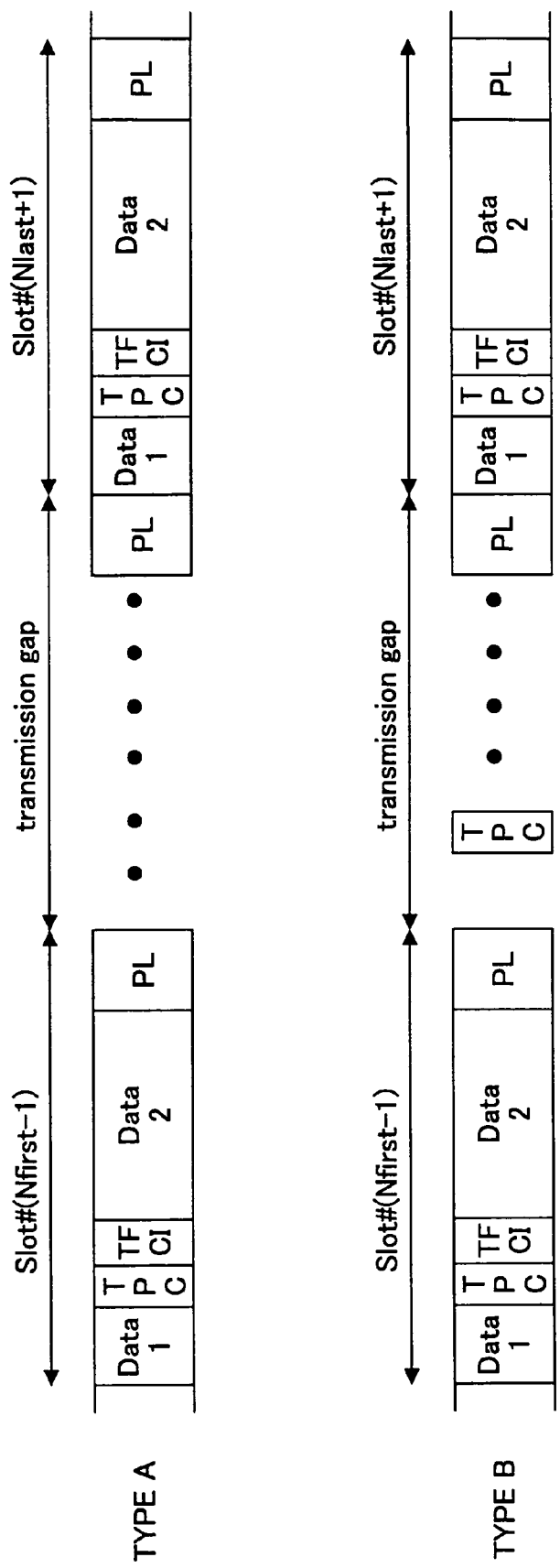
FIG. 3 shows an example of downlink compressed mode frame format.
Figure 4:
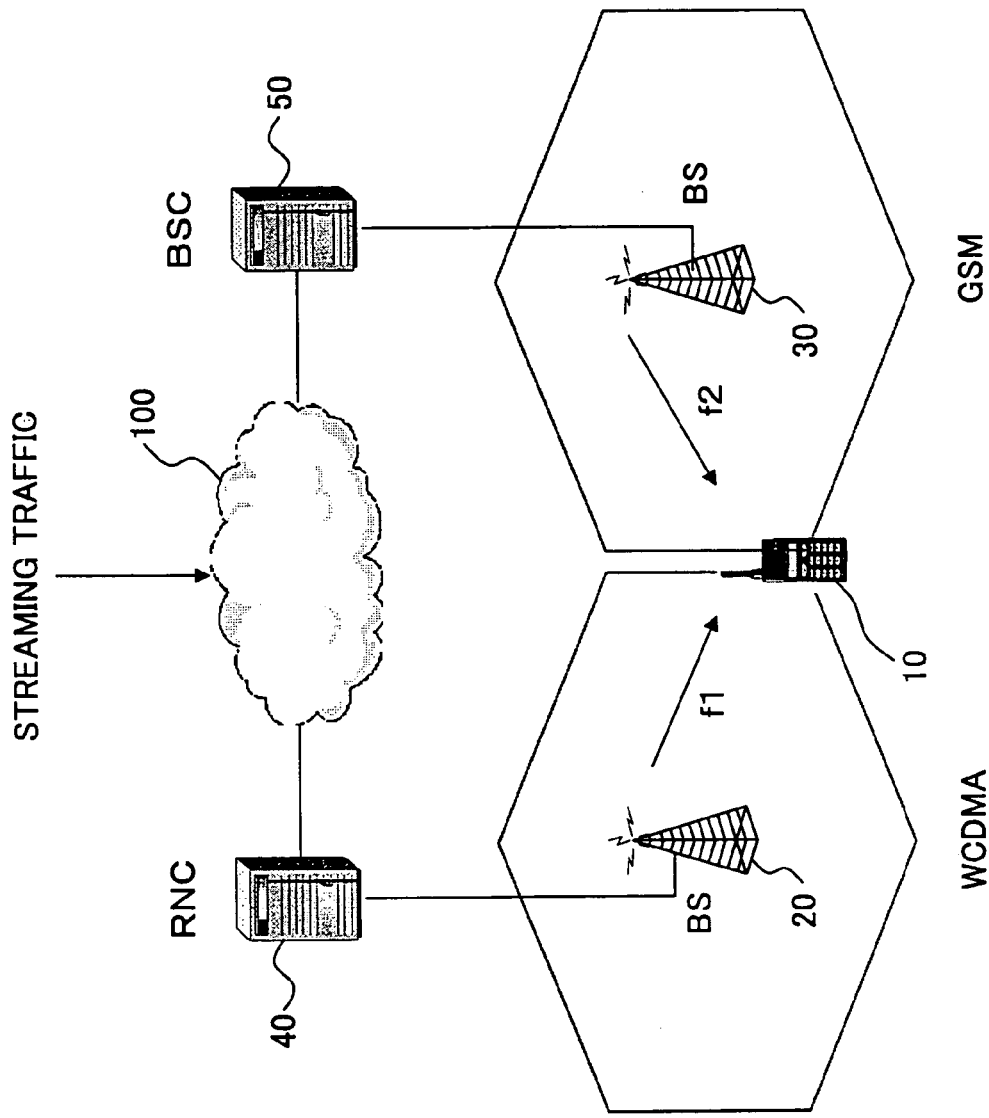
FIG. 4 is a schematic diagram for explaining inter-frequency handover implemented in an embodiment of the present invention.

FIG. 4 is a schematic diagram for explaining inter-frequency handover according to an embodiment of the invention. In this example, a mobile station 10 is going to carry out handover from a wideband code division multiple access (WCDMA) system to a global system for mobile communications (GSM) system. Since the WCDMA system and the GSM system employ different carrier frequencies, the mobile station 10 carries out inter-frequency handover at the boundary between these two systems in order to continue radio communication in the different system.

The WCDMA system illustrated on the left-hand side of FIG. 4 includes a WCDMA radio base station 20 and a radio network controller (RNC) 40 that functions as a mobile communication controlling apparatus to control the radio base station 20. The GSM system illustrated on the right-hand side of FIG. 4 includes a GSM radio base station 30 and a base station controller (BSC) 50 that also functions as a mobile communication controlling apparatus to control the radio base station 30. The WCDMA system and the GSM system are connected to each other via the network 100. To be more precise, connection is established between, for example, the gateway mobile services switching centers (GMSC) of the WCDMA system and the GSM system in order to allow signal transmission between heterogeneous systems.

The WCDMA radio base station 20 and the GSM radio base station 30 transmit radio signals using different carrier frequencies. In this example, the WCDMA radio base station 20 employs carrier frequency f1, and the GSM radio base station 30 employs carrier frequency f2. The mobile station 10 has a dual band receiver capable of receiving signals at frequencies f1 and f2. Inter-frequency handover to the GSM system is carried out when the mobile station 10 is leaving the service area of the WCDMA system, and inter-frequency handover to the WCDMA system is performed when the mobile station is leaving the service area of the GSM system. This type of handover is referred to as inter-system handover because handover is carried out across heterogeneous mobile communications systems.

In order to carry out inter-system handover, the compressed mode is used. When moving from the WCDMA system to the GSM system, the mobile station 10 receives from the network 100 an instruction for switching to the compressed mode. Then, the mobile station 10 starts monitoring radio signals transmitted at carrier frequency f2 from the radio base station 30 of the GSM system during the transmission gap in which the WCDMA radio base station 20 is temporarily suspending signal transmission. The mobile station 10 detects a radio base station that satisfies a prescribed quality of the received signal, and reports this radio base station (in this case, radio base station 30 that is transmitting radio signals at f2) to the RNC 40. Upon receiving the monitoring result from the mobile station 10, the RNC 40 further reports the monitoring result to the BSC 50 via the network 100. Then, the mobile station 10 switches its communication mode from the WCDMA mode to the GSM mode, and starts communication in the GSM system.

In the embodiment, the RNC 40 detects a trigger for inter-frequency handover for the mobile station 10. Upon the detection, if the RNC 40 receives streaming type traffic that greatly affects the delay or the jitter via the network 100, the RNC 40 controls the transmission rates of higher layers so as to reduce data delay as much as possible, and executes a process for inter-frequency handover with the minimum delay, instead of carrying out the ordinary data transmission process.

Figure 5:
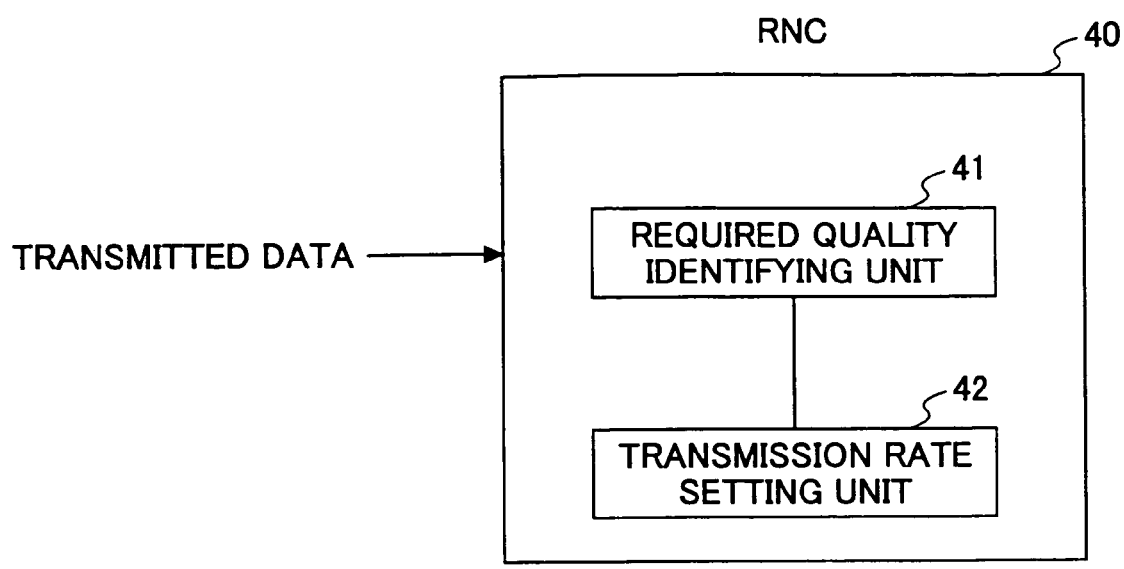
FIG. 5 is a block diagram of the radio network control apparatus (RNC) shown in FIG. 4 according to an embodiment of the invention.

FIG. 5 is a block diagram of the RNC 40 according to an embodiment of the invention. The RNC 40 has a required quality identifying unit 41 and a transmission rate setting unit 42. The required quality identifying unit 41 identifies the quality required for the traffic received from the network 100, and supplies the identification result to the transmission rate setting unit 42. The transmission rate setting unit 42 controls the data transmission rates of higher layers based on the identification result supplied from the required quality identifying unit 41.

Figure 6:
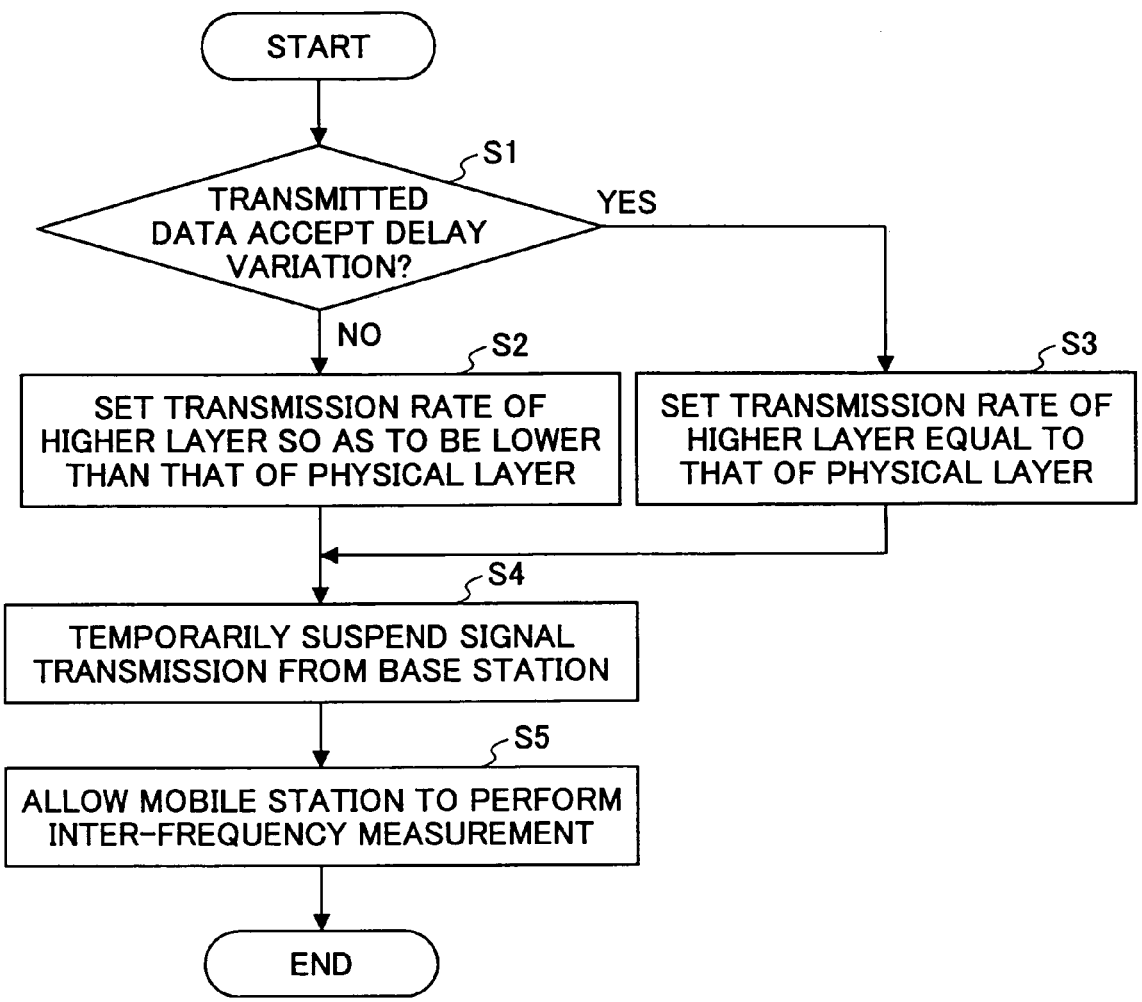
FIG. 6 is a flowchart of the inter-frequency handover control operation carried out by the radio network control apparatus shown in FIG. 5.

FIG. 6 is a flowchart showing the inter-frequency handover control process carried out by the RNC 40.

First, the required quality identifying unit 41 of the RNC 40 determines whether the traffic received from the network 100 is of a type that accepts delay spread or variation in delay (step S1). For this determination, the required quality identifying unit 41 uses a quality identification table.

FIG. 7 shows an example of the quality identification table, which includes (i) a service type field representing priority bits (three bits for IPv4) contained in the packet header, (ii) a delay priority field representing the delay priority defined by the priority bits (e.g., the first two bits of the service type field in this example), and (iii) a QoS field representing the QoS class corresponding to the delay priority. The QoS field has values from 0 to 3, where "0" represents a low quality of service, and "3" represents a high quality of service. If the delay priority is high, that traffic does not accept delay spread or variation in delay.

The required quality identifying unit 41 checks the service type field of the packet header of the received traffic, and refers to the table based on the result of the check. If the value of the service type field of the packet header is "110", the delay priority is "11". In this case, it is determined that the received traffic is comprised of data that do not accept delay fluctuation. It is also determined from the table that the received traffic requires a high quality of service (QoS).

The required quality identifying unit 41 supplies the determination result to the transmission rate setting unit 42. If the determination result indicates that the received traffic does not accept delay variation (NO in step S1), then the transmission rate setting unit 42 sets the transmission rate of a higher layer so as to be lower than the transmission rate of the physical layer (step S2). Then, the transmission rate setting unit 42 temporarily suspends signal transmission from the radio base station 20 connected to the RNC 40 (step S4), and allows the mobile station 10 to carry out inter-frequency measurement (step S5).

On the other hand, if the determination result indicates that the received traffic accepts variation in delay (YES in S1), then the transmission rate setting unit 42 sets the transmission rate of a higher layer equal to the transmission rate of the physical layer (step S3). Then, steps 4 and 5 are performed to allow the mobile station 10 to carry out inter-frequency handover.

Figure 8:
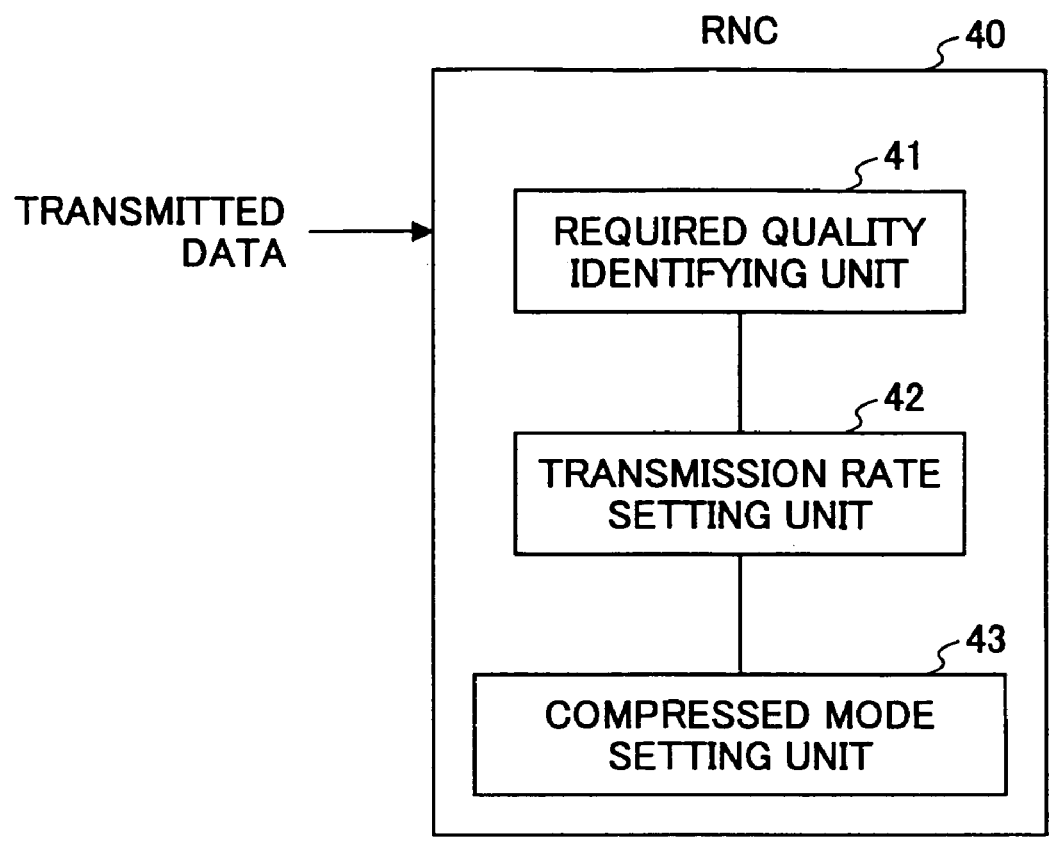
FIG. 8 is a block diagram showing another example of the radio network control apparatus used in the system shown in FIG. 4.

FIG. 8 is a block diagram showing a modification of the RNC 40 according to an embodiment of the invention. The RNC 40 shown in FIG. 8 further includes a compressed mode setting unit 43. With this structure, the transmission rate setting unit 42 supplies a notice of shifting to the compressed mode to the compressed mode setting unit 43. Upon receiving the notice, the compressed mode setting unit 43 sets parameters, such as transmission gap starting slot number (TGSN), transmission gap length (TGL) 1, TGL 2, and the transmission gap distance (TGD), required for the compressed mode. Then, the compressed mode setting unit 43 brings the radio base station 20 into the transmission OFF state, and allows the mobile station 10 to perform inter-frequency measurement. The compressed mode setting unit 43 functions as inter-frequency handover instruction means.

Figure 9:
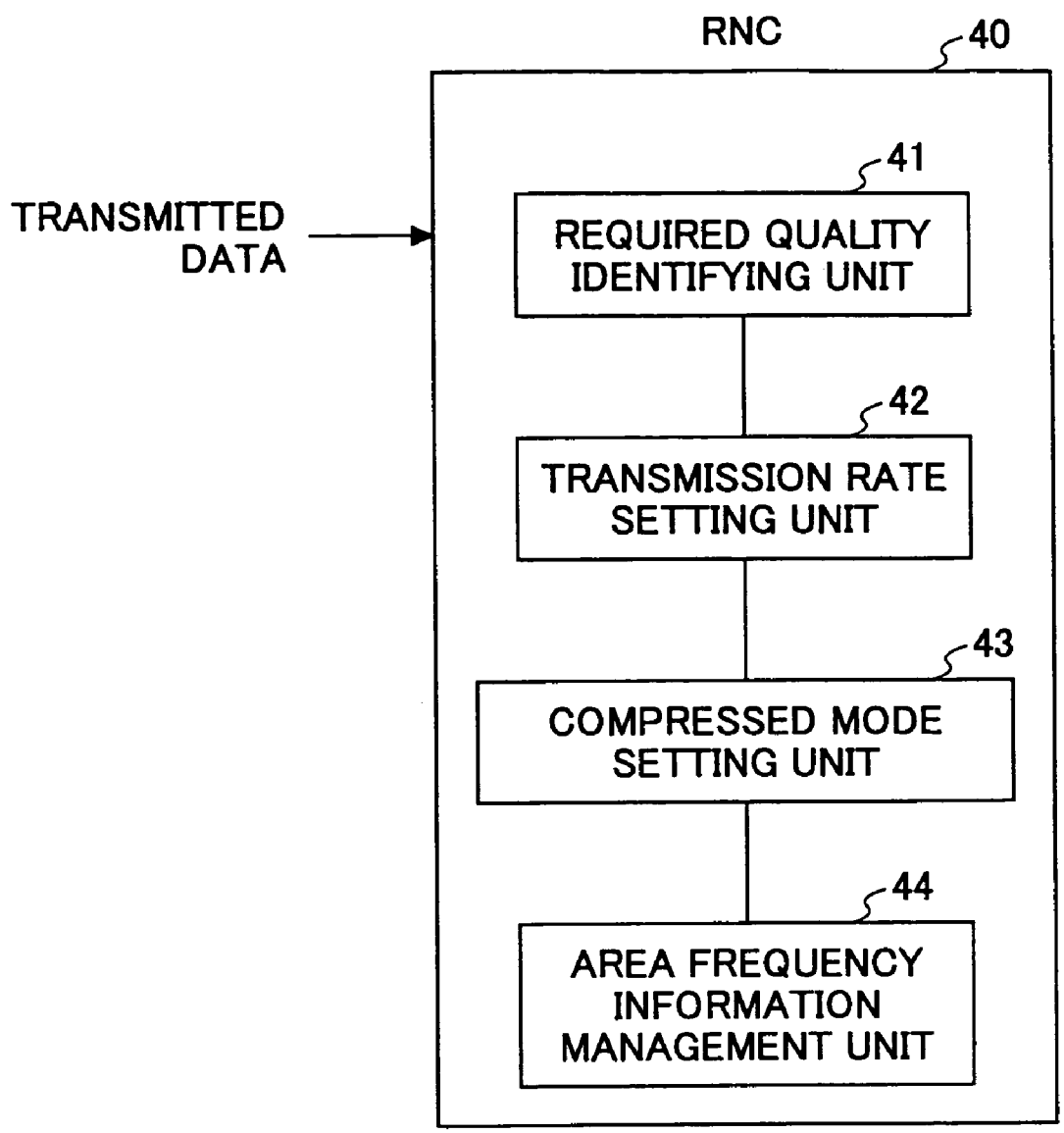
FIG. 9 is a block diagram showing still another example of the radio network control apparatus used in the system shown in FIG. 4.

FIG. 9 is a block diagram showing another modification of the RNC 40 according to an embodiment of the invention. The RNC 40 shown in FIG. 9 includes an area frequency information management unit 44, in addition to the components shown in FIG. 8. The area frequency information management unit 44 has a database storing frequency information about the radio zones of the surrounding areas.

Figure 10:
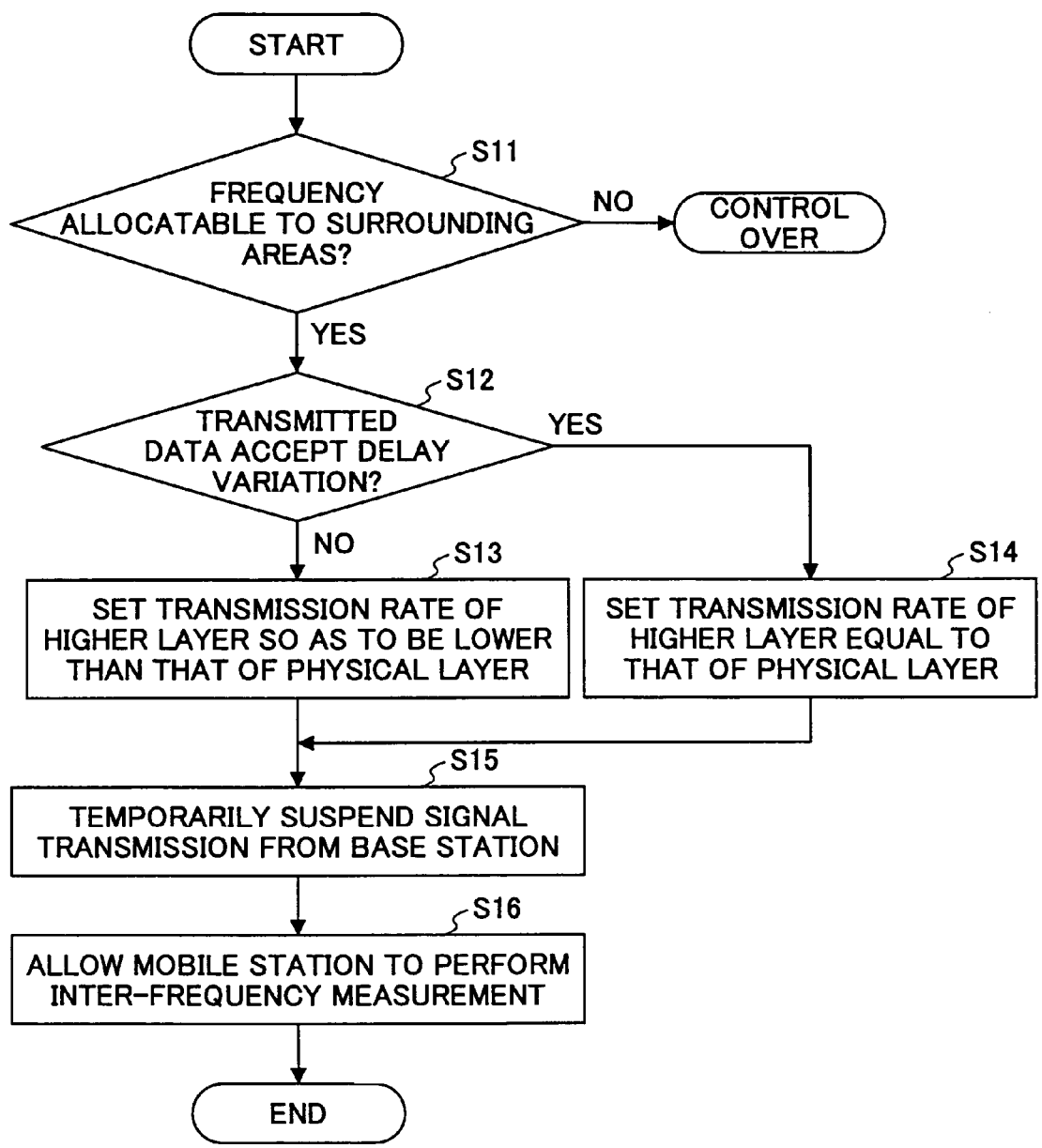
FIG. 10 is a flowchart of the inter-frequency handover control operation carried out by the radio network control apparatus shown in FIG. 9.

FIG. 10 is a flowchart showing the inter-frequency handover control process carried out by the RNC 40 shown in FIG. 9.

The area frequency information management unit 44 determines whether there is an allocatable carrier frequency in the surrounding areas (step S11). If there is an allocatable carrier frequency in the surrounding areas (YES in S11), the determination result is supplied to the required quality identifying unit 41. Upon receiving the determination result indicating the existence of the allocatable frequency, the required quality identifying unit 41 determines whether the received traffic accepts delay variation (step S12). The subsequent steps are same as those shown in FIG. 6, namely, the transmission rate of a higher layer is controlled by the transmission rate setting unit 42, and inter-frequency handover control for the mobile station 10 is performed.

On the other hand, if it is determined in step S11 that there is no frequency allocatable in the surrounding areas (NO in S11), it is regarded that there is not an appropriate candidate to which the mobile station 10 may shift. In this case, the RNC terminates the process, without performing the inter-frequency handover control for the mobile station 10.

With the above-described technique, when the RNC 40 detects traffic (for example, streaming type traffic) that does not accept delay variation, the RNC 40 controls the transmission rate of a higher layer so as to be lower than the physical layer transmission rate (e.g., the wireless link transmission rate). By setting the transmission rate of the higher layer below the physical layer transmission rate, the number of transmission bits to be delayed due to the transmission gap can be reduced, and consequently, data delay can be minimized. After the transmission rate of the higher layer is controlled, the RNC allows the mobile station 10 to perform inter-frequency measurement. In this manner, inter-frequency handover can be performed appropriately even when real-time video data that do not accept delay variation are streamed to the mobile station.

In addition, by controlling the transmission rate of a higher layer after allocatable frequencies in the surrounding areas are confirmed, inter-frequency handover can be performed accurately even when a streaming type service is provided.

The present invention is not limited to the above-described examples, and there are many further modifications and substitutions. For example, in the above-described examples, the data transmission rate of the higher layer is controlled based on the detection of the streaming type traffic that requires real-time control. However, the invention is applicable to the transmission control of the higher layer based on the detection of multicast traffic for delivering real-time application data to a group by multicasting.

To control the data transmission rate of the higher layer to be lower than the physical layer transmission rate, several types of transmission patterns for setting the data transmission rate below that of the physical layer may be prepared in advance, and an appropriate pattern may be selected among them. Alternatively, a transmission rate lower than the physical layer transmission rate may be determined in advance, and the transmission rate of the higher layer may be changed to the predetermined transmission rate when traffic that does not accept delay variation is detected.

Although the preferred embodiment has been described based on inter-system handover between mobile communications systems employing different frequencies, the present invention can be applied to inter-frequency handover within a mobile communications system using multiple (heterogeneous) frequencies.

This patent application is based on and claims the benefit of the earlier filing dates of Japanese Patent Application No. 2003-106817 filed Apr. 10, 2003, the entire contents of which are hereby incorporated by reference.

What is claimed is:

1. A mobile communication controlling apparatus for controlling inter-frequency handover, comprising:
   a required quality identifying unit configured to identify a quality required for data addressed to a mobile station;
   a transmission rate control unit configured to control a data transmission rate of a higher layer, which is higher than a physical layer having a physical layer transmission rate, based on the identification result supplied from the required quality identifying unit; and
   an inter-frequency handover instruction unit configured to temporarily suspend signal transmission from a radio base station in communication with the mobile communication controlling apparatus and allow the mobile station to perform inter-frequency measurement, wherein
   the required quality identifying unit is further configured to determine whether the identified quality accepts delay variation, and if the identified quality does not accept delay variation, the transmission rate control unit is configured to reduce the transmission rate of the higher layer.

2. The apparatus of claim 1, wherein the transmission rate control unit is further configured to reduce the transmission rate of the higher layer to a rate below the physical layer transmission rate of the physical layer when the identified quality does not accept delay variation.

3. The apparatus of claim 1, wherein the inter-frequency handover instruction unit allows the mobile station to implement a compressed mode to perform the inter-frequency measurement.

4. The apparatus of claim 1, further comprising:
   a frequency information management unit configured to manage information about allocatable carrier frequencies of surrounding areas of the radio base station.

5. The apparatus of claim 4, wherein the transmission rate control unit controls the transmission rate of the higher layer if there is an allocatable carrier frequency in the surrounding areas.

6. A method for controlling inter-frequency handover, comprising:
   establishing a wireless link between a mobile station;
   detecting a trigger for inter-frequency handover for the mobile station communicating with the radio base station;
   determining whether a quality required for data transmitted to the mobile station accepts delay variation;
   reducing a data transmission rate of a higher layer, which is higher than a physical layer having a physical transmission rate, if the required quality does not accept delay variation; and
   temporarily suspending signal transmission from the radio base station to allow the mobile station to perform inter-frequency measurement.

* * * * *